United States Patent
Daniels et al.

(10) Patent No.: US 7,711,462 B2
(45) Date of Patent: May 4, 2010

(54) VEHICLE HELP SYSTEM AND METHOD

(75) Inventors: Fonda Daniels, Cary, NC (US); Deirdre H. Duthil, Atlanta, GA (US); Sandra K. Johnson, Austin, TX (US); Ruthie D. Lyle, Durham, NC (US); Kelly Malone, Poughkeepsie, NY (US); Demethria Johnson Ramseur, Smyrna, GA (US)

(73) Assignee: International Business Machines Corporation, Armonk, NY (US)

( * ) Notice: Subject to any disclaimer, the term of this patent is extended or adjusted under 35 U.S.C. 154(b) by 684 days.

(21) Appl. No.: 11/611,421

(22) Filed: Dec. 15, 2006

(65) Prior Publication Data

US 2008/0147262 A1 Jun. 19, 2008

(51) Int. Cl.
*G01M 17/00* (2006.01)
*G06Q 30/00* (2006.01)
*G06F 19/00* (2006.01)

(52) U.S. Cl. .......................... 701/35; 701/2; 701/33; 455/423; 705/14

(58) Field of Classification Search .............. 701/35, 701/2, 33, 29, 32; 455/423, 426.2; 340/426.14, 340/539.24, 539.25; 705/14, 400
See application file for complete search history.

(56) References Cited

U.S. PATENT DOCUMENTS

| | | | |
|---|---|---|---|
| 5,103,498 A | | 4/1992 | Lanier et al. |
| 5,396,422 A | * | 3/1995 | Forchert et al. ............... 701/33 |
| 5,757,645 A | * | 5/1998 | Schneider et al. ............. 701/29 |
| 5,884,202 A | * | 3/1999 | Arjomand ..................... 701/29 |
| 6,233,570 B1 | | 5/2001 | Horvitz et al. |
| RE37,431 E | | 10/2001 | Lanier et al. |
| 6,330,499 B1 | * | 12/2001 | Chou et al. .................... 701/33 |
| 6,434,455 B1 | * | 8/2002 | Snow et al. .................... 701/33 |
| 6,735,503 B2 | * | 5/2004 | Ames ........................... 701/29 |
| 6,873,902 B2 | | 3/2005 | Welch |
| 6,925,368 B2 | | 8/2005 | Funkhouser et al. |
| 7,113,892 B2 | * | 9/2006 | Inoue et al. .................. 702/187 |
| 2006/0142910 A1 | * | 6/2006 | Grier et al. ................... 701/29 |
| 2006/0229777 A1 | * | 10/2006 | Hudson et al. ............... 701/29 |

FOREIGN PATENT DOCUMENTS

JP    2005 102572    4/2005

OTHER PUBLICATIONS

Auto Tech for Windows, http://www.acctax.net/index.htm, downloaded p. 1 of 1 on Aug. 1, 2006.
Have Car Repair Problems, http:www.metacog.com/intro.htm, downloaded pp. 1-2 on Aug. 1, 2006.
Auto and Car Repair Headaches, http://www.metacog.com/example.htm, downloaded pp. 1-3 on Aug. 1, 2006.

(Continued)

*Primary Examiner*—Tan Q. Nguyen
(74) *Attorney, Agent, or Firm*—Anna L. Linne; Greenblum & Bernstein P.L.C.

(57) ABSTRACT

A system and method for providing customized help to a vehicle user when a vehicle problem is detected. The method includes detecting vehicle data that indicates a condition of a vehicle and obtaining profile data comprising an estimated mechanical skill level of a user. The method further includes providing instructions, based upon the profile data and the vehicle data, to the user for addressing the condition.

36 Claims, 3 Drawing Sheets

OTHER PUBLICATIONS

Car Repair Problems, http://www.metacog.com/expample2.htm, downloaded pp. 1-4. on Aug. 1, 2006.

Is Car Repair Eating your Time, http://www.metacog.com/problems.htm, downloaded pp. 1-4 on Aug. 1, 2006.

* cited by examiner

VEHICLE HELP SYSTEM AND METHOD

FIELD OF THE INVENTION

The invention generally relates to a system and method for providing customized information to a user and, more particularly, to a system and method configured to provide information to a vehicle operator in which the information is customized based upon a profile of the operator.

BACKGROUND OF THE INVENTION

Many current automobiles are equipped with onboard monitoring systems that are capable of detecting imminent or occurring operational problems (e.g., low tire air pressure, high engine temperature, etc.) For example, various sensors may be disposed within the vehicle and connected to a microprocessor that analyzes data from the sensors. The sensors may include, for example, tire air pressure sensors, fluid level sensors, temperature sensors, etc. The microprocessor is programmed to recognize predetermined patterns of data from the sensors as indicative of the existence of a current problem or the imminent occurrence of an oncoming problem. The microprocessor is also preprogrammed to alert the driver when a problem is recognized. The alert may take the form of an audible and/or visual warning (e.g., warning chime, dashboard indicator light, text message on a video display, voice recording, etc.). Such systems promote safety and provide drivers with a sense of security.

Although such systems alert the driver of a problem, there is often little or no information available to the driver on how to repair (e.g., fix) the identified problem. The hard copy of the vehicle owner's manual usually provides only generic guidance for troubleshooting minor problems, often for a range of types of vehicles. Moreover, if the driver is in traffic or a deserted area, attempting to use the hard copy of the owner's manual (either by reading while driving or by pulling over) may be cumbersome and/or dangerous. Thus, the hard copy of the owner's manual is often of little use at the time that the problem is occurring.

Aftermarket manuals that provide greater detail of troubleshooting and repair procedures than the typical owner's manual are available in the form of books and CD-ROMs. However, these manuals suffer from some of the same drawbacks as the typical owner's manual. That is, consulting a book or a CD-ROM (e.g., via a laptop computer) is often cumbersome and/or dangerous in driving situations in which many problems occur. Moreover, there is typically so much detailed information packed into these manuals, that a driver having little to no mechanical experience often has trouble finding the information that they need to address the current problem. Thus, in either case, a driver that is presented with a problem by the vehicle monitoring system is often left without adequate instruction for addressing the problem.

Accordingly, there exists a need in the art to overcome the deficiencies and limitations described hereinabove.

SUMMARY OF THE INVENTION

In a first aspect of the invention, there is provided a method comprising detecting vehicle data that indicates a condition of a vehicle and obtaining profile data comprising an estimated mechanical skill level of a user. The method further includes providing instructions, based upon the profile data and the vehicle data, to the user for addressing the condition.

In another aspect of the invention, there is provided a system comprising a computing device that operates to receive vehicle data from sensors of a vehicle and transmit the vehicle data and profile data of a user across a communication network. The computing device further operates to receive instructions based upon the transmitted vehicle data and profile data and communicate the instructions to the user.

In another aspect of the invention, there is provided a method comprising receiving operational data of a vehicle and determining a condition of the vehicle based upon the operational data. The method further includes acquiring profile data of a user and transmitting the profile data and at least one of the operational data and the condition of the vehicle to a location that is remote from the vehicle. The method also includes, based upon the transmitting, receiving instructions for addressing the condition of the vehicle, and communicating the instructions to the user.

In yet another aspect of the invention, there is provided a computer program product comprising a computer readable medium having a computer readable program, wherein the computer readable program when executed on a computer causes the computer to receive operational data of a vehicle and determine a condition of the vehicle based upon the operational data. The computer readable program further causes the computer to acquire profile data of a user and transmit the profile data and at least one of the operational data and the condition of the vehicle to a location that is remote from the vehicle. The computer readable program further causes the computer to, based upon the transmitting, receive instructions for addressing the condition of the vehicle, and communicate the instructions to the user.

In a further aspect of the invention, there is provided a system comprising at least one of a hardware and software component for providing customized instructions to a user of a vehicle, the at least one of a hardware and software component configured to receive profile data of the user and receive at least one of operational data of the vehicle and a determined condition of the vehicle. The at least one of a hardware and software component is further configured to access a database of instruction sets and retrieve an instruction set that is associated with the profile data of the user and the at least one of operational data of the vehicle and a determined condition of the vehicle. The at least one of a hardware and software component is further configured to transmit the instruction set to the vehicle.

DETAILED DESCRIPTION OF EMBODIMENTS OF THE INVENTION

The invention is directed to a system and method of providing customized help to a vehicle user when a problem is detected. The help is customized based upon the problem itself, and further upon a predetermined profile of the user. The profile contains information that is indicative of the user's mechanical ability. The customized help may comprise, for example, step-by-step instructions for addressing the detected problem, which instructions are tailored to the user's mechanical ability and understanding. Alternatively or additionally, the customized help may comprise instructions to await a tow service or to drive to the nearest service station for repair.

Figure 1:
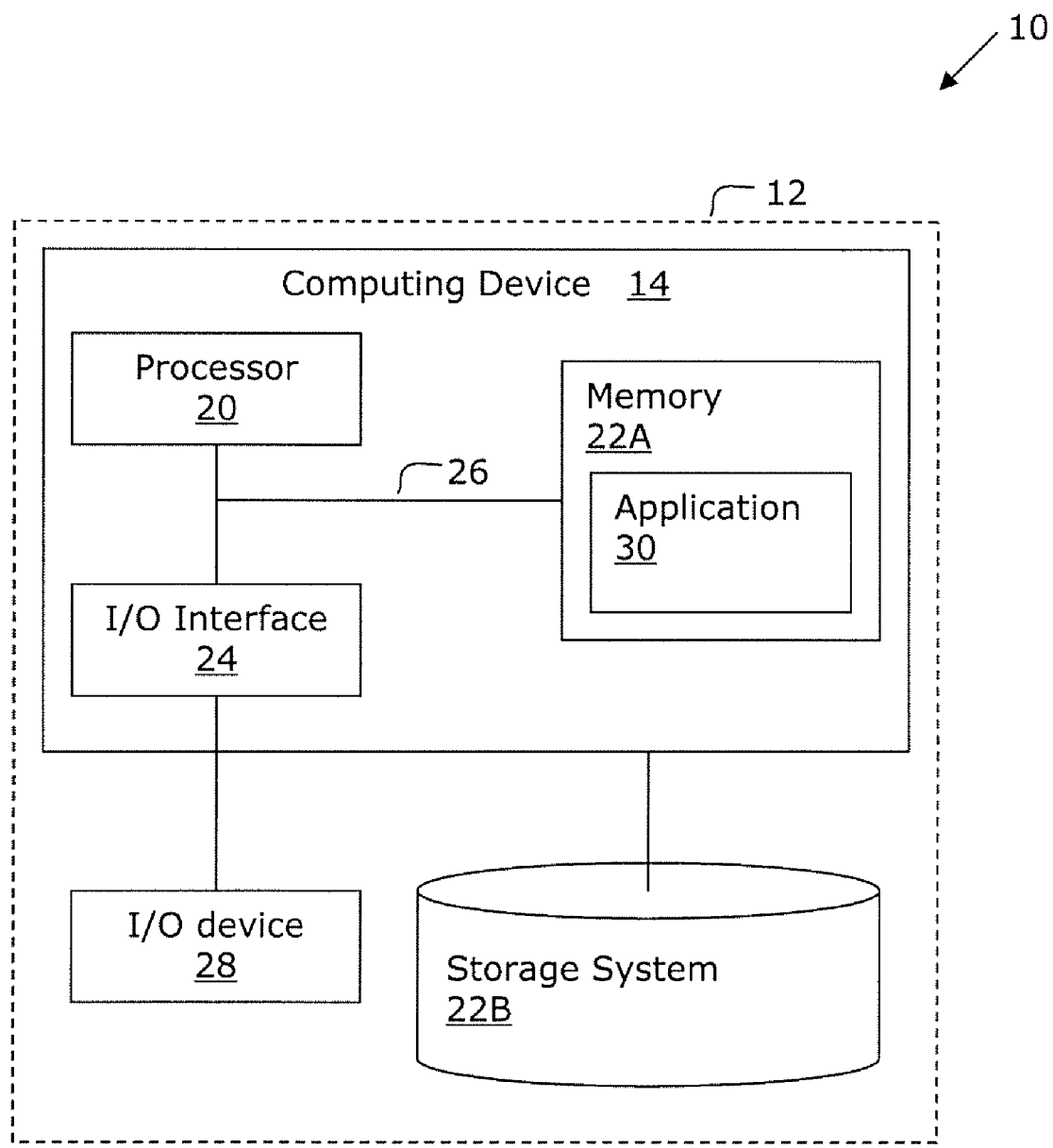
FIG. 1 shows an illustrative environment for implementing the steps in accordance with the invention.

FIG. 1 shows an illustrative environment 10 for managing the processes in accordance with the invention. To this extent, the environment 10 includes a computer infrastructure 12 that can perform the processes described herein. In particular, the computer infrastructure 12 includes a computing device 14 that comprises a management system 30, which makes computing device 14 operable to perform processes described herein. The computing device 14 includes a processor 20, a memory 22A, an input/output (I/O) interface 24, and a bus 26. Further, the computing device 14 is in communication with an external I/O device/resource 28 and a storage system 22B.

In general, the processor 20 executes computer program code, which is stored in memory 22A and/or storage system 22B. While executing computer program code, the processor 20 can read and/or write data to/from memory 22A, storage system 22B, and/or I/O interface 24. The bus 26 provides a communications link between each of the components in the computing device 14. The I/O device 28 can comprise any device that enables an individual to interact with the computing device 14 or any device that enables the computing device 14 to communicate with one or more other computing devices using any type of communications link.

The computing device 14 can comprise any general purpose computing article of manufacture capable of executing computer program code installed thereon (e.g., a personal computer, server, handheld device, etc.). However, it is understood that the computing device 14 is only representative of various possible equivalent computing devices that may perform the processes described herein. To this extent, in embodiments, the functionality provided by computing device 14 can be implemented by a computing article of manufacture that includes any combination of general and/or specific purpose hardware and/or computer program code. In each embodiment, the program code and hardware can be created using standard programming and engineering techniques, respectively.

Similarly, the computer infrastructure 12 is only illustrative of various types of computer infrastructures for implementing the invention. For example, in embodiments, the computer infrastructure 12 comprises two or more computing devices (e.g., a server cluster) that communicate over any type of communications link, such as a network, a shared memory, or the like, to perform the process described herein. Further, while performing the process described herein, one or more computing devices in the computer infrastructure 12 can communicate with one or more other computing devices external to computer infrastructure 12 using any type of communications link. The communications link can comprise any combination of wired and/or wireless links; any combination of one or more types of networks (e.g., the Internet, a wide area network, a local area network, a virtual private network, etc.); and/or utilize any combination of transmission techniques and protocols. As discussed herein, the management system 30 enables the computer infrastructure 12 to provide customized help to a user.

In embodiments, the invention provides a business method that performs the process steps of the invention on a subscription, advertising, and/or fee basis. That is, a service provider, such as a Solution Integrator, could offer to perform the processes described herein. In this case, the service provider can create, deploy, maintain, and support, etc., a computer infrastructure that performs the process steps of the invention for one or more customers. In return, the service provider can receive payment from the customer(s) under a subscription and/or fee agreement and/or the service provider can receive payment from the sale of advertising content to one or more third parties.

Figure 2:
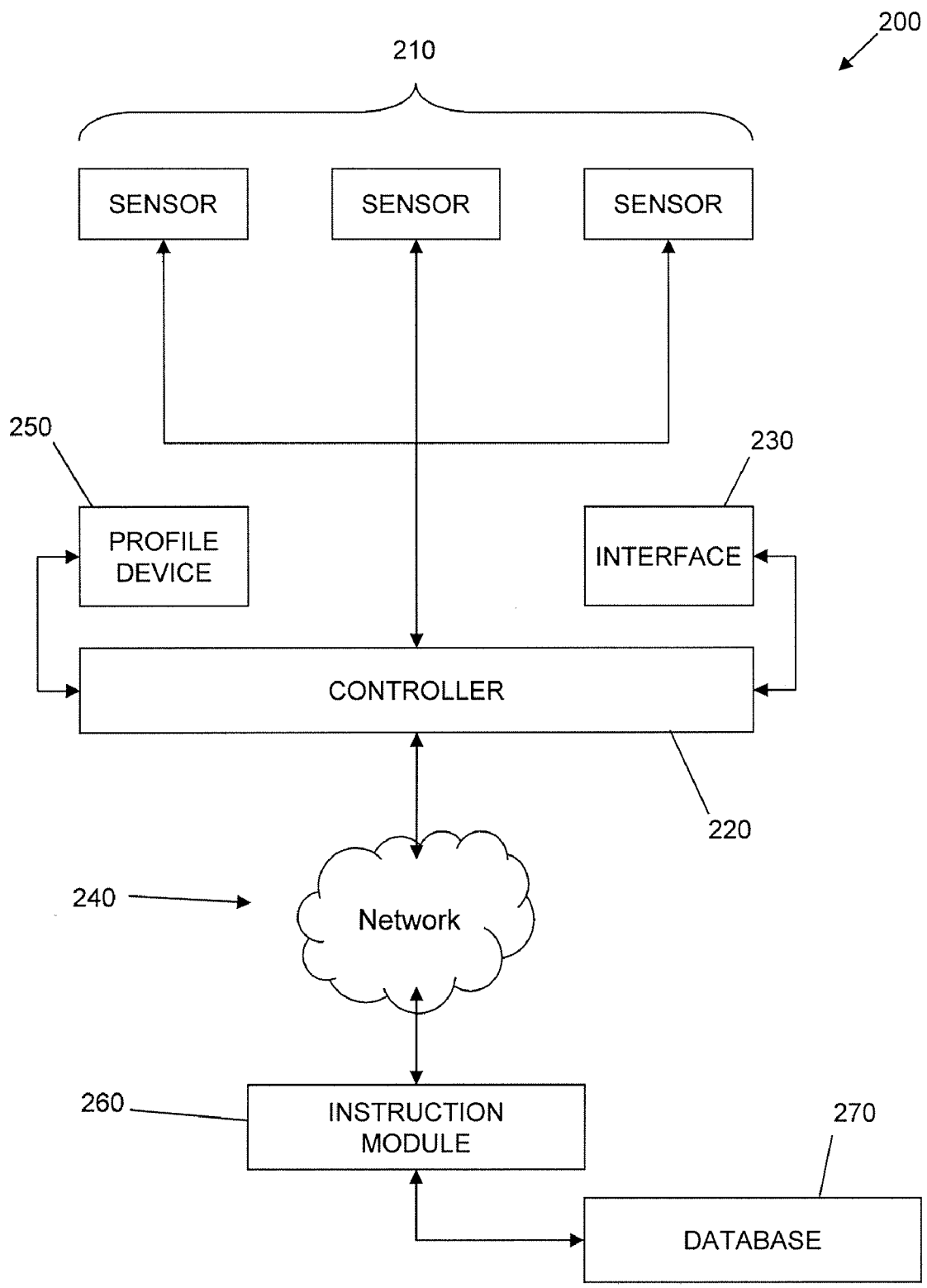
FIG. 2 shows a customized vehicle help system according to aspects of the invention.

FIG. 2 shows a system 200 according to aspects of the invention. The system 200 is arranged to provide customized help (e.g., instructions for how to address a vehicle problem) to a vehicle operator. The help is customized based at least partly on a user profile and on sensed vehicle data. For example, the profile may comprise data regarding a user's mechanical experience, familiarity with vehicles, physical limitations, etc., while the sensed vehicle data may comprise data from various measurement devices disposed on the vehicle for monitoring the real-time performance of various aspects of the vehicle. In implementations, the user profile data and sensed vehicle data are used as the basis for the generation of customized help that instructs a user how to address a sensed vehicle problem. While the system 200 is described with respect to an automobile, it is understood that implementations of the invention may be used with any vehicle, such as, for example, a car, truck, motorcycle, watercraft, aircraft, etc.

The system 200 comprises at least one sensor 210 for detecting operating conditions of the vehicle. In embodiments, multiple sensors 210 are employed for detecting various operating conditions of the vehicle (e.g., tire air pressure, engine temperature, oil pressure, oxygen sensor, etc.). Any suitable number of sensors and any suitable type of sensor may be used according to the requirements of the system 200.

The system 200 further comprises a controller 220, which is connected in electrical communication with the sensors 210. In embodiments, the controller 220 comprises a microprocessor, although any suitable type of controller (e.g., processor, electronic control unit (ECU), central processing unit (CPU), etc.) may be used. The controller 220, by way of its connection to the sensors 210, receives sensed (e.g., measured, detected) data regarding the various operating conditions of the vehicle.

In implementations, the controller 220 further comprises data storage capability (e.g., read/write memory, ROM, EPROM, etc.) in which certain predetermined threshold values associated with the various sensors 210 are stored. By comparing the sensed operating conditions of the vehicle to the predetermined threshold values, the controller 220 may determine when a particular condition (e.g., problem) exists (or is imminent) with the vehicle. For example, the controller 220 may have in its memory a threshold value of twenty pound per square inch that is associated with the tire air pressure sensor. As the controller 220 receives sensed data from the tire air pressure sensor, it compares the data value to the threshold value. When the sensed data value is less than the threshold value, the controller 220 may issue an alert to the driver that a tire has low air pressure. In this manner, the controller 220 and sensors 210 operate to monitor various operating conditions of the vehicle.

Still referring to FIG. 2, the system 200 further comprises an interface 230 between the controller 220 and a user. The interface 230 is connected in electrical communication to the controller 220 and provides a mode of communication between the controller 220 and a user. For example, the interface 230 may comprise a video screen and speaker for providing images and sounds. The interface 230 may further comprise user inputs, such as, for example, push buttons or touch screen capability, by which the user may send commands to the controller. In embodiments, the interface 230 comprises a dashboard-mounted touch-screen display and speaker(s).

Further according to aspects of the invention, the controller 220 is connected to a network 240, such as, for example, a wireless communication network. The connection may be embodied in any suitable manner, such as an antenna that is electrically connected to the controller 220 and arranged to send and receive electromagnetic signals to and from the network 240. Moreover, the network 240 may be used as a conduit for providing information to the controller 220, such as global positioning system (GPS) data that can be used by the controller 220 to display navigational aids (e.g., maps, driving directions, etc.) via the interface 230. Although the network 240 is described with respect to GPS data, it is understood that the network 240 may provide other types of communication with the controller 220, such as radio communication, telephone communication, internet access, etc.

The system 200 further comprises a profile device 250 that communicates with the controller 220 to provide the controller 220 with the necessary information to provide customized help based upon a user profile, which is described in greater detail below. The profile device 250 may comprise a device that stores the user profile data and communicates the user profile data to the controller 220. For example, the profile device 250 may comprise a flash drive (e.g., memory stick) on which user profile data is stored, and an associated communication port in the vehicle that is capable of receiving the flash drive and communicating the user profile data to the controller 220. Similarly, the user profile data may be stored in a hand-held computing device (e.g., cellular telephone, personal digital assistant, etc.), and communicated to the controller 220 via a wireless connection (e.g., Bluetooth, etc.). Methods for storing and communicating data are known, and any suitable method may be used to store the user profile data and communicate it to the controller 220.

Alternatively, the profile device 250 may comprise any device or combination of devices that enable a user to assert his or her identity to the controller 220, such that the user profile data may be retrieved from a stored location (e.g., memory of the controller 220, memory in a remote location accessible by the network 240, etc.). For example, the profile device 250 may comprise a keypad in which the user may enter (e.g., type) a unique code that is associated with the user and communicated to the controller 220. As a further example, the profile device 250 may comprise a radio frequency identification (RFID) device that is associated with a user identity, and a sensor for detecting the RFID device and communicating the user identity to the controller 220. For example, the RFID device may be disposed in a key fob, and the sensor may be embedded in a part of the vehicle such that the user may identify himself by passing the key fob in the vicinity of the sensor.

As an even further example, the profile device 250 may comprise a microphone and voice recognition device that are connected to the controller 220 and that allow a user to assert their identity by vocalizing a code (e.g., word or phrase). As an even further example, the profile device 250 may comprise a fingerprint recognition device that is connected to the controller 220 and that allows a user to assert their identity by touching it with a finger. In any event, when the controller 220 receives the identification data from the profile device 250, the controller 220 may retrieve/access user profile data that is based upon a predetermined association between the identification data and the user profile data. The user profile data may be stored in the memory of the controller 220 or in some other location. As described above, methods for storing and communicating data are known, and any suitable method may be used to store the identification data and communicate it to the controller 220.

Referring still to FIG. 2, the system 200 further comprises an instruction module 260 that communicates with the controller 220 via the network 240. In embodiments, the instruction module 260 comprises a general purpose computing machine that is capable of receiving data from the controller 220 over the network 240. The computing machine may further comprise a determiner module that, based upon input data (e.g., sensed vehicle data and user profile data), generates output data (e.g., customized help instructions). In implementations, the instruction module 260 comprises a human operator that performs the functions of receiving input data and generating customized instructions. In any event, the instruction module 260 is preferably disposed at a location that is remote from the vehicle (e.g., at a vehicle dealership, a vehicle help operations center, etc.)

In embodiments, the instruction module 260 comprises, or may access, a database 270. The database 270 may comprise any suitable conventional database, and is populated with numerous unique sets of help data that provide instructions to a user for dealing with a vehicle problem. The database 270, in implementations of the invention, includes a look-up table that provides a unique result (e.g., customized help data) based upon a set of input parameters (e.g., sensed vehicle data and user profile data). In this manner, when the controller 220 determines from the sensed data that the vehicle is experiencing a problem, the controller 220 may communicate the sensed vehicle data and the user profile data to the instruction module 260. The instruction module 260 then accesses the database 270 to find the specific help data that corresponds to the input parameters. The instruction module 260 then communicates the help data back to the controller 220 via the network 240, and the controller 220 communicates the help data to the user via the interface 230.

The help data may comprise data in any form that is capable of being stored (e.g., in the database) and then communicated to the user via the interface 230. The help data may comprise, for example, text of a numbered list of actions for the user to take (e.g., steps for changing a tire), which can be displayed on a video screen (e.g., interface 230). Or the help data may comprise an audio data file instructing a user what to do (e.g., call a tow truck), which may be played on the vehicle speaker system. Alternatively or additionally, the help data may comprise a video file that instructs and demonstrates a task (e.g., shows a video of how to change a tire), which may be played on a vehicle video screen.

It is understood that the help data that populates the database is necessarily predetermined, created, and stored into the database. In this regard, the help data may comprise any type of data that is generated in any known fashion, such as by manual entry (e.g., typing), uploading of video data, etc. Moreover, the associations or rules that the instruction module 260 uses to associate given input data with a specific instance of help data are predetermined and programmed into the instruction module 260. Each specific instance of help data (e.g., instruction set), and the associations of input data (e.g., sensed vehicle data and user profile data) that lead to it, are preferably developed (e.g., determined) by a skilled mechanic and then appropriately programmed into the instruction module 260 and database 270.

Alternatively or additionally to being displayed to the user via the interface 230, the help data may comprise data that is communicated to a third party, such as a roadside assistance service or car service center. For example, an instance of help data for a severe mechanical problem, which cannot be fixed by the user, may comprise data that causes the controller 220 to communicate information (e.g., request for tow, vehicle location (via GPS), sensed problem, etc.) to a third party via the network 240. That is, the help data that results from certain input parameters (e.g., sever mechanical problem, very low user skill level, etc.) may comprise a component that operates to cause the controller 220 to automatically notify a third party of the vehicle problem and request appropriate assistance.

Figure 3:
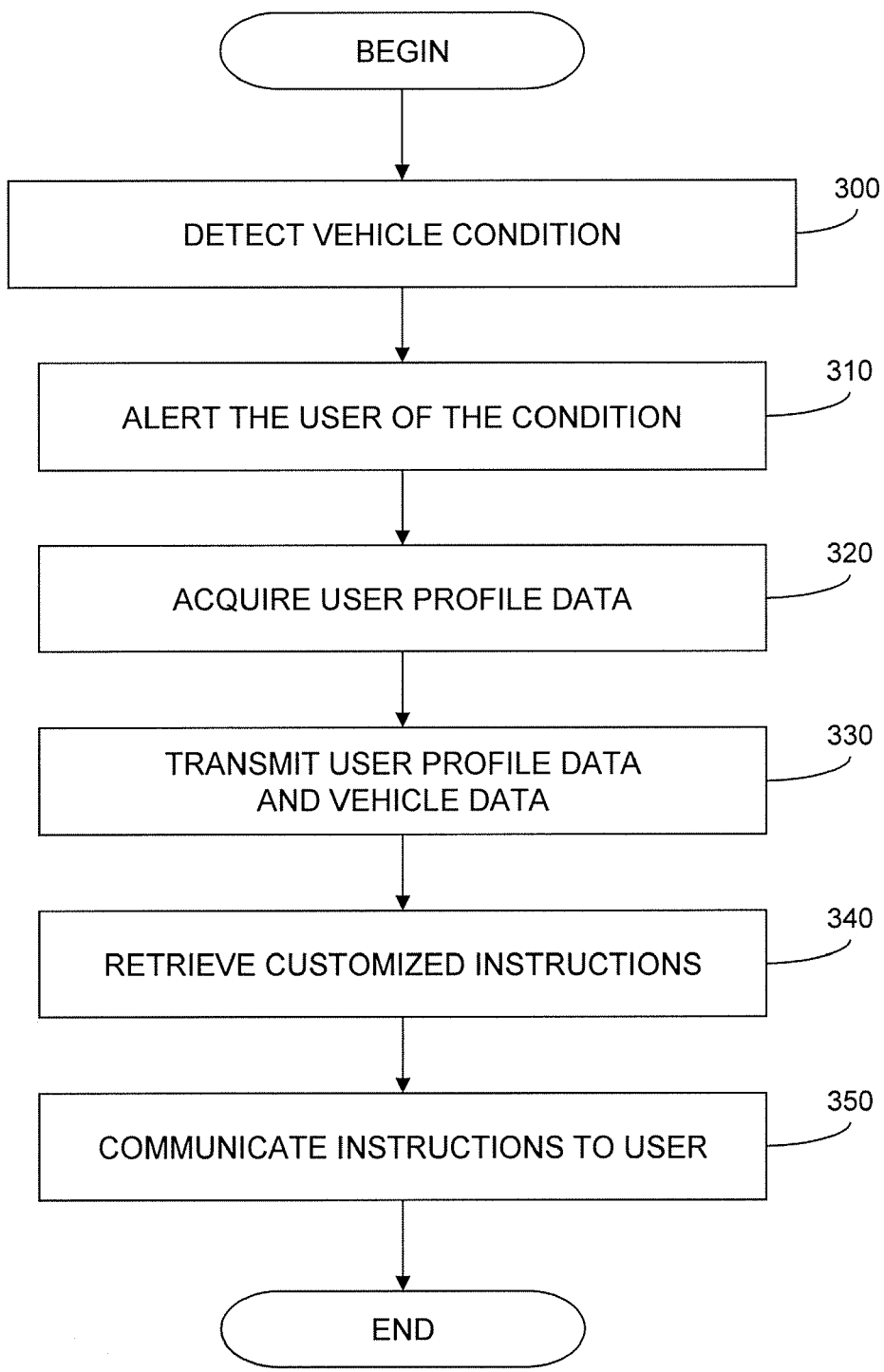
FIG. 3 is a flow chart of steps for implementing aspects of the invention.

FIG. 3 is a flow diagram implementing steps of the invention which may be implemented in the environment of FIG. 1. FIG. 3 may equally represent a high-level block diagram of the invention. The steps of FIG. 3 may be implemented and executed from either a server, in a client server relationship, or they may run on a user workstation with operative information conveyed to the user workstation to providing customized help to a vehicle user. Additionally, the invention can take the form of an entirely hardware embodiment, an entirely software embodiment or an embodiment containing both hardware and software elements.

In an embodiment, the invention is implemented in software, which includes but is not limited to firmware, resident software, microcode, etc. Furthermore, the invention can take the form of a computer program product accessible from a computer-usable or computer-readable medium providing program code for use by or in connection with a computer or any instruction execution system. The software and/or computer program product can be implemented in the environment of FIG. 1, as should be understood and capable of implementation by those of skill in the art. For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

Referring back to FIG. 3, at step 300, a vehicle condition (e.g., problem) is detected. In embodiments, the detection is performed by the controller monitoring and comparing vehicle sensor data to stored threshold values, as described above.

At step 310, the controller alerts the user to the problem that was detected in step 300. In embodiments this comprises displaying a message on a dashboard-mounted video screen, although other interfaces may be used, as described above.

At step 320, the user profile data is acquired. In embodiments, the controller prompts the user to provide their user profile data or identification data. For example, the controller may display a message on the interface instructing the user to insert a flash drive containing their user profile data into a communication port. The user profile data is then uploaded to the controller. Alternatively, the controller may display a message on the interface instructing the user to pass an RFID key fob in the vicinity of a sensor. Based upon the identification data, the controller may access associated profile data that is stored in memory that is accessible by the controller.

It is understood that step 320 may be performed before or after either of steps 300 and 310. For example, the user profile data may be automatically determined (i.e., without prompting the user) when the user inserts the key into the ignition switch. This may be accomplished, for example, by sensing information stored in the key fob (as described above) when the user places the key in the vehicle ignition switch. The information may comprise the user profile data or identity information that is associated with user profile data that is stored in the controller or database. When the user profile data has been determined prior to step 310, the method continues from step 310 to step 330 without prompting the user to identify themselves again.

At step 330, the user profile data and sensed vehicle data are communicated to the instruction module. The determined vehicle condition may also be communicated. In embodiments, this comprises the controller transmitting the user profile data and sensed vehicle data over a wireless network to the instruction module, as described above.

At step 340, the customized instructions are retrieved. In embodiments, the instruction module retrieves a particular instance of help data from a database based upon the user profile data and sensed vehicle data, as described above.

At step 350, the customized instructions are communicated to the user. In embodiments, this comprises the instruction module transmitting the help data over the network to the controller, and the controller communicating the help data to the user via the interface, as described above. In this manner, the user is provided with customized instructions for how to address a sensed vehicle problem.

Examples of Use

For increased understanding of the invention, the following non-limiting examples of implementations of the invention are provided. In an exemplary scenario, a user who purchases a car from the dealer (or has a system according to the invention installed in his or her car) answers a questionnaire regarding general mechanical skill level, familiarity with car parts and tools, etc. The answers of the questionnaire are formatted and stored as user profile data in the memory of the car controller, and associated with the identification code of an RFID device. The RFID device is embedded in the key fob of the car ignition key.

The user inserts the key into the ignition switch, and a sensor mounted in close vicinity to the steering column detects the embedded RFID device. The sensor communicates the detected identification data to the controller, which accesses the user profile data.

As the user drives the car, the controller, by way of the sensed data from the various vehicle operational sensors, determines that the car is experiencing a problem. For example, the right front tire is losing air pressure and going flat.

The controller alerts the user to the problem by displaying a flashing text on the dashboard mounted video screen. The controller also transmits the sensed vehicle data (low tire air pressure) and the user profile data to the instruction module.

The instruction module receives the sensed vehicle data and user profile data as input parameters, and accesses the database to determine the specific help data that corresponds to the set of input parameters. The instruction module also transmits the help data back to the controller, which then communicates the help data to the user.

As describe herein, the help data is customized based upon the input data. For example, in the scenario above, the sensed vehicle data may comprise a tire air pressure reading that is only slightly below the recommended value, and the user profile data may indicate that the user has moderate mechanical skill. In this case, the help data may comprise instructions that tell the user to proceed to a service station and add five pounds of air pressure to the right front tire. The help data may be communicated to the user by way of a text message that is displayed on the dashboard-mounted video screen. The instructions may be combined with a conventional navigation system, such that the video screen displays the instruction to drive to a service station and direction on how to get there.

Still referring to the scenario above, the sensed vehicle data may comprise a tire air pressure reading that is close to zero (i.e., a flat tire), and the user profile data may indicate that the user has moderate mechanical skill. In this case the help data may comprise instructions that tell the user to pull over to a safe place and change the right front tire. The help data may further include instructions on how to change a tire for this particular vehicle (e.g., where the jack is located, how to operate the jack, where the spare tire is located, etc.). The help data may be communicated to the user in any suitable way, including at least one of text, video, and audio message.

Still referring to the scenario above, the sensed vehicle data may comprise a tire air pressure reading that is close to zero (i.e., a flat tire). However, in this example, the user profile data may indicate that the user has zero mechanical skill. In this case, the help data may comprise instructions that tell the user to pull over to a safe place and call a roadside assistance service (e.g., tow truck). Alternatively, or additionally, the help data may include a portion that causes the controller to automatically notify a roadside assistance service of the location of the car (via GPS) and the nature of the problem (flat tire, user needs assistance).

In this manner, implementations of the invention provide a system and method of providing customized help to a vehicle user when a vehicle problem is detected. The customized help is more useful to the user than a conventional owner's manual or aftermarket repair manual, because the customized help takes into account the sensed parameters of the problem and the user's predefined skill set. Moreover, the customized help may operate to automatically notify a roadside assistance service of a need for help, thus providing increased benefit to the user.

While the invention has been described in terms of embodiments, those skilled in the art will recognize that the invention can be practiced with modifications and in the spirit and scope of the appended claims.

What is claimed is:

1. A method comprising:
   detecting vehicle data that indicates a condition of a vehicle;
   obtaining profile data comprising an estimated mechanical skill level of a user;
   transmitting the vehicle data and the profile data from the vehicle over a wireless communication link; and
   providing instructions, based upon the profile data and the vehicle data, to the user for addressing the condition.

2. The method of claim 1, further comprising receiving the transmitted profile data and vehicle data.

3. The method of claim 1, further comprising identifying a database entry that is associated with the profile data and the vehicle data.

4. The method of claim 3, further comprising transmitting content of the database entry to the vehicle over the wireless communication link.

5. The method of claim 1, wherein the providing instructions comprises communicating content of a database entry to the user.

6. The method of claim 5, wherein the communicating the content of the database entry to the user comprises at least one of: presenting the content on a video display of the vehicle, and presenting the content by way of audio played on a speaker of the vehicle.

7. The method of claim 1, wherein the detecting, obtaining, and providing are performed by an electronics system comprised in the vehicle.

8. The method of claim 1, further comprising automatically communicating at least one of the vehicle data and the condition of the vehicle to a third party.

9. The method of claim 8, wherein the third party comprises at least one of: a roadside assistance provider and a dealership service department.

10. The method of claim 1, wherein at least one of the detecting, the obtaining, and the providing is performed on a subscription, advertising, or fee basis.

11. The method of claim 10, wherein at least one of the detecting, the obtaining, and the providing is performed by a service provider.

12. The method of claim 1, further comprising at least one of creating, maintaining, and supporting a computer infrastructure that performs the steps of claim 1.

13. The method of claim 1, further comprising:
   automatically communicating at least one of the vehicle data and the condition of the vehicle to a third party, wherein the third party comprises at least one of: a roadside assistance provider and a dealership service department; and
   receiving the instructions at the vehicle;
   wherein the providing the instructions comprises playing content on at least one of a video screen comprised in the vehicle and audio speakers comprised in the vehicle;
   the detecting, obtaining, and providing are performed by an electronics system comprised in the vehicle;
   the obtaining the profile data comprises receiving identification information from the user;
   the receiving identification information from the user comprises at least one of: detecting a radio frequency identification device, receiving a code that is entered by the user, and receiving a code that is spoken by the user; and
   the profile data is stored in a memory of a controller that is part of the electronics system comprised in the vehicle.

14. A system, comprising a computing device that operates to:
   receive vehicle data from sensors of a vehicle;
   transmit the vehicle data and profile data of a user across a communication network;
   receive instructions based upon the transmitted vehicle data and profile data; and
   communicate the instructions to the user.

15. The system of claim 14, wherein the profile data comprises an estimated mechanical skill level of a user.

16. The system of claim 14, wherein the computing device includes a computer processor that is comprised in the vehicle.

17. The system of claim 14, wherein the computing device stores the profile data.

18. The system of claim 17, wherein the computing device receives identification information from the user and accesses the stored profile data based upon the identification information.

19. The system of claim 14, wherein the system further comprises an interface device through which the instructions are communicated to the user.

20. The system of claim 19, wherein the interface device comprises a video screen that is part of the vehicle.

21. A method, comprising:
   receiving operational data of a vehicle;
   determining a condition of the vehicle based upon the operational data;
   acquiring profile data of a user;
   transmitting the profile data and at least one of the operational data and the condition of the vehicle to a location that is remote from the vehicle;

based upon the transmitting, receiving instructions for addressing the condition of the vehicle; and communicating the instructions to the user.

22. The method of claim 21, wherein the profile data comprises at least one of: an estimated level of user mechanical skill, and an estimated level of user vehicle familiarity.

23. The method of claim 21, wherein the steps of claim 21 are performed by a computing device that is comprised in the vehicle.

24. The method of claim 21, further comprising automatically communicating at least one of the vehicle data and the condition of the vehicle to a third party.

25. The method of claim 24, wherein the third party comprises at least one of: a roadside assistance provider and a dealership service department.

26. The method of claim 21, wherein the steps of claim 21 are performed on a subscription, advertising, or fee basis.

27. The method of claim 21, further comprising at least one of creating, maintaining, and supporting a computer infrastructure that performs the steps of claim 21.

28. The method of claim 21, further comprising obtaining the instructions based upon the profile data and the at least one of the operational data and the condition of the vehicle.

29. The method of claim 28, wherein the obtaining comprises accessing a database.

30. The method of claim 29, wherein the accessing is performed by a computing device.

31. The method of claim 29, wherein the accessing is performed at least in part by a human operator.

32. The method of claim 21, wherein the acquiring profile data of a user comprises receiving identification information from the user.

33. The method of claim 32, wherein the receiving identification information from the user comprises at least one of: detecting a radio frequency identification device, receiving a code that is entered by the user, and receiving a code that is spoken by the user.

34. The method of claim 21, wherein the acquiring profile data of a user comprises receiving the profile data from a data storage device.

35. A computer program product comprising a computer readable medium having a computer readable program, wherein the computer readable program when executed on a computer causes the computer to:

receive operational data of a vehicle;

determine a condition of the vehicle based upon the operational data;

acquire profile data of a user;

transmit the profile data and at least one of the operational data and the condition of the vehicle to a location that is remote from the vehicle;

based upon the transmitting, receive instructions for addressing the condition of the vehicle; and communicate the instructions to the user.

36. A system comprising at least one of a hardware and software component for providing customized instructions to a user of a vehicle, the at least one of a hardware and software component configured to:

receive profile data of the user;

receive at least one of operational data of the vehicle and a determined condition of the vehicle;

access a database of instruction sets;

retrieve an instruction set that is associated with the profile data of the user and the at least one of operational data of the vehicle and a determined condition of the vehicle; and transmit the instruction set to the vehicle.

* * * * *